(12) United States Patent
Bargeron

(10) Patent No.: US 7,546,525 B2
(45) Date of Patent: Jun. 9, 2009

(54) FREEFORM DIGITAL INK REVISIONS

(75) Inventor: David M. Bargeron, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 11/171,064

(22) Filed: Jun. 30, 2005

(65) Prior Publication Data

US 2007/0022371 A1 Jan. 25, 2007
US 2007/0283240 A9 Dec. 6, 2007

Related U.S. Application Data

(63) Continuation-in-part of application No. 10/934,306, filed on Sep. 3, 2004.

(51) Int. Cl.
G06F 17/00 (2006.01)
G06F 17/28 (2006.01)

(52) U.S. Cl. .............. 715/230; 715/231; 715/232; 715/233; 715/268

(58) Field of Classification Search ............ 715/512, 715/230, 231, 232, 233, 268; 382/188
See application file for complete search history.

(56) References Cited

U.S. PATENT DOCUMENTS

| | | | |
|---|---|---|---|
| 3,701,095 A | 10/1972 | Yamaguchi et al. | |
| 4,955,066 A | 9/1990 | Notenboom | |
| 5,109,433 A | 4/1992 | Notenboom | |
| 5,181,255 A | 1/1993 | Bloomberg | |
| 5,237,628 A | 8/1993 | Levitan | |
| 5,297,216 A * | 3/1994 | Sklarew | 382/189 |
| 5,465,353 A | 11/1995 | Hull et al. | |
| 5,499,294 A | 3/1996 | Friedman | |
| 5,526,444 A | 6/1996 | Kopec et al. | |
| 5,542,006 A | 7/1996 | Shustorovich et al. | |
| 5,594,809 A | 1/1997 | Kopec et al. | |
| 5,699,244 A | 12/1997 | Clark et al. | |
| 5,812,698 A | 9/1998 | Platt et al. | |
| 5,832,474 A * | 11/1998 | Lopresti et al. | 707/2 |
| 5,867,597 A | 2/1999 | Peairs et al. | |
| 5,999,653 A | 12/1999 | Rucklidge et al. | |
| 6,137,908 A | 10/2000 | Rhee | |
| 6,279,014 B1 | 8/2001 | Schilit et al. | |
| 6,356,922 B1 | 3/2002 | Schilit et al. | |
| 6,397,212 B1 | 5/2002 | Biffar | |
| 6,470,094 B1 | 10/2002 | Lienhart et al. | |

(Continued)

OTHER PUBLICATIONS

Authors: Sriram Ramachandran (Rutgers University) and Ramanujan Kashi (Avaya Labs Research) Title: An Architecture for ink Annotations on Web Documents Publisher: Proceedings of the Seventh International Conference on Document Analysis and Recognition Date: Aug. 3-6, 2003 pp. 256-260 vol. 1 Retrieved from IEEE Xplore on Sep. 27, 2006.*

(Continued)

*Primary Examiner*—Boris Pesin
(74) *Attorney, Agent, or Firm*—Lee & Hayes, PLLC

(57) ABSTRACT

A computer-implemented system for digital ink revisions is provided. The system comprises an annotation module that recognizes a handwritten annotation in an image of a document. The system further comprises a command module that executes a command associated with the recognized handwritten annotation. Methods for using the system are also provided.

20 Claims, 11 Drawing Sheets

U.S. PATENT DOCUMENTS

| | | | |
|---|---|---|---|
| 6,487,301 B1 | 11/2002 | Zhao | |
| 6,523,134 B2* | 2/2003 | Korenshtein | 714/16 |
| 6,546,385 B1 | 4/2003 | Mao et al. | |
| 6,580,806 B1 | 6/2003 | Sato | |
| 6,587,217 B1 | 7/2003 | Lahey et al. | |
| 6,594,393 B1 | 7/2003 | Minka et al. | |
| 6,658,623 B1* | 12/2003 | Schilit et al. | 715/513 |
| 6,687,876 B1 | 2/2004 | Schilit et al. | |
| 6,869,023 B2 | 3/2005 | Hawes | |
| 6,928,548 B1 | 8/2005 | Hale et al. | |
| 6,938,203 B1 | 8/2005 | Dimarco et al. | |
| 7,024,054 B2 | 4/2006 | Cahill et al. | |
| 7,062,497 B2* | 6/2006 | Hamburg et al. | 707/101 |
| 7,111,230 B2 | 9/2006 | Euchner et al. | |
| 7,120,299 B2 | 10/2006 | Keskar et al. | |
| 7,327,883 B2 | 2/2008 | Polonowski | |
| 7,373,291 B2 | 5/2008 | Garst | |
| 2002/0032698 A1 | 3/2002 | Cox | |
| 2002/0116379 A1 | 8/2002 | Lee et al. | |
| 2003/0076537 A1 | 4/2003 | Brown | |
| 2003/0123733 A1* | 7/2003 | Keskar et al. | 382/187 |
| 2003/0152293 A1 | 8/2003 | Bresler et al. | |
| 2004/0003261 A1 | 1/2004 | Hayashi | |
| 2004/0015697 A1 | 1/2004 | De Queiroz | |
| 2004/0078757 A1* | 4/2004 | Golovchinsky et al. | 715/512 |
| 2004/0090439 A1 | 5/2004 | Dillner | |
| 2004/0107348 A1 | 6/2004 | Iwamura | |
| 2004/0189667 A1 | 9/2004 | Beda et al. | |
| 2004/0205542 A1 | 10/2004 | Bargeron et al. | |
| 2004/0205545 A1 | 10/2004 | Bargeron et al. | |
| 2004/0252888 A1 | 12/2004 | Bargeron et al. | |
| 2005/0138541 A1 | 6/2005 | Euchner et al. | |
| 2005/0165747 A1 | 7/2005 | Bargeron et al. | |
| 2006/0045337 A1 | 3/2006 | Shilman et al. | |
| 2006/0050969 A1* | 3/2006 | Shilman et al. | 382/224 |

OTHER PUBLICATIONS

Authors:Ivan Poupyrev (Hiroshima University, University of Washington), Numada Tomokazu (Hiroshima University), and Suzanne Weghorst (University of Washington) Title: Virtual Notepad: Handwriting in Immersive VR Publisher: IEEE, Proceedings of VRAIS' Atlanta, Georgia Date: Mar. 1998 Retrieved from CiteSeer on Sep. 28, 2006.*
Authors: Marcel Gotze, Stefan Schlechtweg, and Thomas Strothotte (Otto-von-Guericke University of Magdeburg) Title: The Intelligent Pen--Toward a Uniform Treatment of Electronic Documents Date: 2002 Retrieved from CiteSeer on Sep. 28, 2006.*
U.S. Appl. No. 11/095,393, Bargeron et al.
U.S. Appl. No. 11/165,070, Bargeron.
Vinajak R. Borkar, et al., Automatically extracting structure from free text addresses, 2000, 6 pages, In Bulletin of the IEEE Computer Society Technical commitee on Data Engineering. IEEE.
Remco Bouckaert, Low level information extraction: A bayesian network based approach, 2002, 9 pages, In Proceedings of TextML 2002, Sydney, Australia.
Claire Cardie, et al., Proposal for an interactive environment for information extraction, 1988, 12 pages, Technical Report TR98-1702, 2.
Rich Caruana, et al., High precision information extraction, Aug. 2000, 7 pages, In KDD-2000 Workshop on Text Mining.
M.Collins, Discriminative training methods for hidden markov models : Theory and experiments with perception algorithms, Jul. 2002, pp. 1-8, In Proceedings of Empirical Methods in Natural Language Processing (EMNLP02).
Corinna Cortes, et al., Support-vector networks. Machine Learning, 1995, 20(3): 273-297.
Y. Freund, et al., Large margin classification using the perceptron algorithm, Machine earning, 37(3):277-296.
Y. Freund, et al., Experiments with a new boosting algorithm, 1996, In International Conference on Machine Learning, pages 148-156.

T. Krist Jansson, et al., Interactive information extraction with constrained conditional random fields, 2004, In Proceedings of the 19th International conference on artificial intelligence, AAAI. pp. 412-418.
John Lafferty, et al., Conditional random fields: Probabilistic models for segmenting and labeling sequence data, 2001, In Proc.18th International Conf. on Machine Learning, pp. 282-289. Morgan Kaufmann, San Francisco, CA.
M. Marcus, et al., The penn treebank: Annotating predicate argument structure, 1994, pp. 114-119.
Andrew McCallum, Efficiently inducing features of conditional random fields, 2003, 8 pages, in Nineteenth Conference on Uncertainty in Artificial Intelligence (UA103).
Andrew McCallum, et al., Early results for named entity recognition with conditional random fields, feature induction and web-enhanced lexicons, 2003, 4 pages, In Hearst/Ostendorf, Eds, HLT-NAACL, Ass'n for Computational Linguistics, Edmonton, Alberta, Canada.
Kamal Nigam, et al., Using maximum entropy for text classification, 1999, 7 pages, In Proceedings of the IJCAI'99 Workshop on Information Filtering.
David Pinto, et al., Table extraction using conditional random fields, 2003, 8 pages, In Proceedings of the ACM SIGR'03, Jul. 28-Aug. 1, 2003, Toronto, Canada.
L.R. Rabiner, A tutorial on hidden markov models and selected applications in speech recognition, 1989, In Proceedings of the IEEE, vol. 77, pp. 257-286.
Fei Sha, et al., Shallow parsing with conditional random fields. In Hearst/Ostendorf, Eds, 2003, HLT-NAACL: Main Prcoeedings, pp. 213-220, AssZZZn for Computational Linguistics, Edmonton, Alberta, Canada.
J. Stylos, et al., Citrine:providing intelligent copy-and-paste, 2005, In Proceedings of ACM Symposium on User interface Software and Technology (UIST 2004), pp. 185-188.
B. Taskar, et al., Max-margin parsing, 2004, 8 pages, In Empirical Methods in Natural Language Processing (EMLP04).
S. Mao, et al., Document structure analysis algorithms: A literature survey, Jan. 2003, vol. 5010, pp. 197-207, In Proc. SPIE Electronic Imaging.
M. Krishnamoorthy, et al., Syntactive segmentation and labeling of digitized pages from technical journals, 1993, IEEE Transactions on Pattern Analysis and Machine Intelligence, vol. 15, pp. 737-747.
J. Kim, et al., Automated labeling in document images, Jan. 2001, pp. 1-12, In Document Recognition and Retrieval VIII, vol. 4307. Availabel online at http://archive.nlm.nih.gov/pubs/kim/spie2001/spie2001.pdf, last checked Apr. 2, 2006.
D.Niyogi, et al., Knowledge-based derivation of document logical structure, 1995, pp. 472-475, In Third International Conference on Document Analysis and Recognition, Montreal, Canada.
A. Conway, Page Grammars and Page Parsing: A Syntactic Approach to Document Layout Recognition, 1993, In Proceedings of the 2nd International Conference on Document Analysis and Recognition, Tsukuba Science City, Japan, pp. 761-764.
E.G. Miller, et al., Ambiguity and constraint in mathematical expression recognition, 1998, 8 pages, In Proceedings of the National Conference of Artificial Intelligence. American Association of Artificial Intelligence.
T. Tokuyasu, et al., Turbo recognition: a statistical approach to layout analysis, 2001, in Proceedings of the SPIE, San Jose, CA, vol. 4307, pp. 123-129.
T. Kanungo, et al., Stochastic language model for style-directed physical layout analysis of documents, 2003, pp. 583-596, In IEEE Transactions on Image Processing, vol. 5, No. 5.
D. Blostein, et al., Applying compiler techniques to diagram recognition, In Proceedings of the 16th International Conference on Pattern Recognition, 2002, vol. 3, pp. 123-136.
J. F. Hull, Recognition of mathematics using a two dimensional trainable context-free grammar, MasterZZZs thesis, MIT, Jun. 1996, 101 pages.
N. Matsakis, Recognition of handwritten mathematical expressions, May 1999, pp. 1-59, MasterZZZs thesis, Massachusetts Institude of Technology, Cambridge, MA.
J. Lafferty, et al., Conditional Random Fields: Probabilistic Models for Segmenting and Labeling Sequence Data, 2001, In Proceedings of the 18th International Conference on Machine Learning, Morgan Kaufmann, San Francisco, CA, pp. 282-289.

E. Charniak, et al., Edge-Based Best-First Chart Parsing, 1998, In Proceedings of the 14th National Conference on Artifical Intelligence, pp. 127-133.

D. Klein, et al., A* parsing: Fast Exact Vitebi Parse Selection, Stanford University, 2001, 8 pages, Tech. Rep. dbpubs/2002-16.

Y. Freund, et al., A Decision-Theoretic Generalization of On-line Learning and an Application to Boosting, 1995, In Computational Learning Theory: Eurocolt ZZZ95, Springer-Verlag, pp. 23-37.

I. Philips, et al., Cd-rom Document Database Standard, In Proceedings of the 2nd International Conference on Document Analysis and Recognition (ICDAR), 1993, pp. 478-483.

P. Viola, et al., Rapid object Detection Using a Boosted Cascade of Simple Features, 2001, pp. 1-9, In Proceedings of the IEEE Conference on Computer Vision and Pattern.

T. Breuel, High Performance Document Layout Analysis, 10 pages, In 2003 Symposium on Document Image Understanding Technology, Greenbelt Maryland.

R. Zanibbi, et al., A Survey of Table Recognition: Models, Observations, Transformations, and Inferences, International Journal of Document Analysis and Recognition, 2004, vol. 7, No. 1. pp. 1-16.

K. F. Chan, et al., Mathematical Expression Recognition: A Survey, 2000, International Journal on Document Analysis and Recognition, vol. 3, pp. 3-15.

E. Charniak, Statistical Techniques for Natural Language Parsing, AI Magazine, 1997, vol. 18, No. 4, pp. 33-44.

M. Kay, Chart Generation, In Prcoeedings of the 34th Annual Meeting of the Association for Computational Linguistics (ACL '96), Santa Cruz, California, 1996, pp. 200-204.

M. Viswanathan, et al., Document Recognition: An Attribute Grammar Approach, March 1996, In Proc. SPIE vol. 2660, Document Recognition III, Vincent/Hull, Eds., pp. 101-111.

C.D. Manning, et al., Foundation of Statistical Natural Language Processing. The MIT Press, 1999, pp. 1-3.

Tobias Schefer, et al., Active Hidden Markov Models For Information Extraction, In Advances in Intelligent Data Analysis, 4th International Conference, IDA 2001, pp. 309-318.

P. Chou, Recognition Of Equations Using a 2-D Stochastic Context-Free Grammar, In SPIE Conference on Visual Communications and Image Processing, Philadelphia, PA, 1989, pp. 852-863.

M. Kay, Algorithm Schemata And Data Structures In Syntactic Processing, 1986, pp. 35-70.

Michael Shilman, et al., Spatial Recognition and Grouping of Text and Graphics, Eurographics Workshop on Sketch-Based Interfaces and Modeling, 2004, 5 pages, Hughes/Jorge, EDs.

Michael Shilman, et al., Recognition and Grouping of Handwritten Text in Diagrams and Equations, IWFHR 2004, Sep. 2004, pp. 69-77, Toyko, Japan.

Michael Shilman, et al., Recognizing Freeform Digital Ink Annotations, IAPR International Workshop on Document Analysis Systems, Sep. 8-10, 2004, 12 pages, Florence, Italy.

R. Hauck. Partial European Search Report. Apr. 15, 2005, 2 pages, Munich, Germany.

"About Virtual Desktop Managers". Accessible from http://www.virtual-desktop.info/Last accessed on May 17, 2006, 3 pages.

Tung-Shou Chen, et al., "A New Search Engine for Chinese Document Image Retrieval Based on Chinese Character Segmentation Features". International Journal of Computer Processing of Oriental Languages, 2002, pp. 417-431. vol. 14, No. 4.

D. Doermann. "The Index and Retrieval of Document Images: A' Survey". Computer Vision and Image Understanding, Jun. 1998, pp. 287-298, vol. 70. No. 3, Academic Press, San Diego, CA, US.

D. Doermann, et al. "The detection of duplicates in document image databases." Proceedings of the 4th International Conference on Document Analysis and Recognition. ULM, Germany, Aug. 18-20, 1997, pp. 314-318, Proceeding of the ICDAR, Los Alamitos, IEEE Comp. Soc. US, vol. II.

Jonathan J. Hull, et al., "Document Image Similarity and Equivalence Detection". ICDAR'97, 1997, pp. 308-312, vol. 1, Ulm, Germany.

John F. Cullen, et al., "Document Image Database Retrieval and Browsing using Texture Analysis". ICDAR'97, 1997, pp. 718-721, Ulm, Germany.

Nevin Heintze, "Scalable Document Fingerprinting (Extended Abstract)". Proceedings of the Second USENIX Workshop on Electronic Commerce, 1996, pp. 1-10.

Narayanan Shivakumar, et al., "The Scam Approach to Copy Detection in Digital Libraries". D-Lib Magazine, 1995, 9 pages.

Sergey Brin, et al., "Copy Detection Mechanisms for Digital Documents". Proceeedings of the ACM SIGMOD Annual Conference, 1995, pp. 1-21.

B. ERol, et al. "Institute of Electrical and Electronics Engineers: Linking presentation documents using image analysis". Conference Record of the 37th Asilomar Conference on Signals, System, & Computers. Pacific Grove, CA, US, Nov. 9-12, 2003. pp. 97-101. Asilomer Conference on Signals, Systems and Computers, New York, NY, IEEE, vol. 1 of 2.

European Search Report dated February 1, 2006 for European Patent Application No. EP05000750, 7 pages.

Benolin Jose, et al. "Vector Based Image Matching for Indexing in Case Based Reasoning Systems". 4th German Workshop on Case-based Reasoning-System Development and Evaluation, 1996, pp. 1#7.

J.J. Hull. "Document Image Matching and Retrieval with Multiple Distortion-Invariant Descriptors". Document Analysis Systems, World Scientific Publishing Co. 1995. pp. 379-396: Retrieved from the internet: http://rii.richoh. com/_hull/pubs/hull_das94.pdf_. Retrieved on Dec. 6, 2005.

J.J. Hull, et al. "Document Image Matching Techniques". Symposium on Document Image Understanding Technology, Apr. 30, 1997, pp. 31-35.

Wang Shin-Ywan, et al. "Block selection: a method for segmenting a page image of various editing styles." Document Analysis and Recognition, 1995. Proceedings of the Third International Conference on Montral, Quebec, Canada. Aug. 14-16 1995. pp. 128-133. Los Alamitos, CA, IEEE Computer Soc., US, Vol. 1.

V. Eglin, et al. "Document page similarity based on layout visual saliency: application to qyery by example and document classification". Document Analysis and Recognition. 2003. Proceedings of the 7th International Conference. Aug. 3-6, 2003. Piscataway, NJ. IEEE, Aug. 3, 2003, pp. 1208-12121.

C.L. Tan, et al. "Text extraction using pyramid." Pattern Recognition, Jan. 1998, pp. 63-72, vol. 1, no. 1, Elsevier, Kidlington, GB.

H. Peng, et al. "Document image template matching based on component block list". Pattern Recognition Letters, Jul. 2001, pp. 1033-1042, vol. 22, No. 9, North-Holland Publ. Amsterdam, NL.

S. Mitaim, et al. "Neutral fuzzy agents that learn a user's preference map". Digital Libraries, 1999. ADL '97. Proceedings, IEEE International Forum on REsearch and Technology Advances in Washington, D.C. , US May 7-9, 1997, Los Alamitos, IEEE Comp. Soc. US, May 7, pp. 25-35.

Ming Ye, et al., "Document Image Matching and Annotation Lifting". Proceedings of the 6th International Conference on Document Analysis and Recognition (ICDAR 2001), Seattle, Washington, Sep. 10-13, 2001, pp. 753-760.

Michael Collins, et al., "Logistic Regression, AdaBoost, and Bregman Distances", Machine Learning, 48(1/2/3) 2002, pp. 1-26.

Thomas M. Cormen, et al., "Introduction to Aglorithms", Cambridge, MA: The MIT Press, 1990, p. 448.

Hans P. Graf, et al., "Analysis of Complex and Noisy Check Images", Proceedings of IEEE International Conference on Image Processing (KIP-95). IEEE Computer Society Press, 1995, pp. 316-319.

Patrice Y. Simard, et al., "An Efficient Binary Image Activity Detector Based on Connected Components", International Conference on Accoustic, Speech and Signal Processing (ICASSP), Montreal, May 2004, pp. 229-232.

Yefeng Zheng, et al., "Machine Printed Text and Handwriting Identification in Noisy Document Images" In IEEE Transactions on Pattern Analysis and Machine Intelligence, March 2003, pp. 337-353, vol. 26, No. 3.

DAvid Bargeron, et al. "Boosting-Based Transductive Learning for Text Detection". Proceedings of the 8th International Conference on Document Analysis and Recognition (ICDAR'05), pp. 1166-1171.

Vladimir N. Vapnik, Statistical Learning Theory, 1998, pt. 1, 62 pages (front cover-40).

Vladimir N. Vapnik, Statistical Learning Theory, 1998, pt. 2, 62 pages (41-100).
Vladimir N. Vapnik, Statistical Learning Theory, 1998, pt. 3, 62 pages (101-162).
Vladimir N. Vapnik, Statistical Learning Theory, 1998, pt. 4, 62 pages (163-226).
Vladimir N. Vapnik, Statistical Learning Theory, 1998, pt. 5, 60 pages (227-287).
Vladimir N. Vapnik, Statistical Learning Theory, 1998, pt. 6, 60 pages (288-348).
Vladimir N. Vapnik, Statistical Learning Theory, 1998, pt. 7, 62 pages (349-413).
Vladimir N. Vapnik, Statistical Learning Theory, 1998, pt. 8, 50 pages (414-464).
Vladimir N. Vapnik, Statistical Learning Theory, 1998, pt. 9, 41 pages (465-505).
Vladimir N. Vapnik, Statistical Learning Theory, 1998, pt. 10, 35 pages (506-540).
Vladimir N. Vapnik, Statistical Learning Theory, 1998, pt. 11, 35 pages (541-576).
Vladimir N. Vapnik, Statistical Learning Theory, 1998, pt. 12, 65 pages (577-642).
Vladimir N. Vapnik, Statistical Learning Theory, 1998, pt. 13, 45 pages (643-686).
Vladimir N. Vapnik, Statistical Learning Theory, 1998, pt. 14, 50 pages (687-back cover).
S. Marinai, et al., "Recognizing Freeform Digital Ink Annotations" Proceedings of the 6th International Workshop on Document Analysis Systems, 2004, vol. 2163, pp. 322-331.

G. Golovchinsky, et al., "Moving Markup: Repositioning Freeform Annotation" UIST 02. Proceedings of the 15th Annual ACM Symposium on user Interface Software and Technology, 2002, vol. conf. 15, pp. 21-29.
European Search Report dated Dec. 29, 2006, mailed for European Patent Appl. No. 05 108 068.7, 2 Pages.
Bargeron Et Al, "Reflowing Digital Ink Annotations, " Paper: Techiques for On Screen Shapes, Text and Handwriting. CHI 2003, Apr. 5-10, 2003, Ft. Lauderdale, Florida, USA., vol. 5, Issue No. 1, pp. 358-392. http://www.dgp.toronto.edu/ZZZtomer/store/papers/reflowchi03.pdf. Last accessed Nov. 4, 2008, 8 pages.
Ellis et al, "A Collaborative Annotation System for Data Visualization," Proceedings of the working conference on Advanced Visual Interfaces, May 25-28, 2004, ACM 1-58113-867-9/04/0500, pp. 411-414. http://delivery.acm.org/10.1145/99000/989938/p411-ellis.pdfZZZ key1ZZZ989938&key2ZZZ1838085221&collZZZGuide&dlZZZGuide&CFIDZZZ9420863&CFTOKENZZZ15500950. Last accessed Nov. 4, 2008, 4 pages.
IHSIN Phillips, et al., "CD-ROM Document Database Standard" Proc. Second Int'l Conf. on Document Analysis and Reconition, 1993, pp. 478-483. Last accessed Nov. 4, 2008, 6 pages.
Murphey, et al. "Neural Learning Using AdaBoost" Proceedings IJCNN '01, International Joint Conference on Neural Networks, 2001. pp. 1037 - 1042, vol.2. Last accessed Nov. 6, 2008, 6 pages.
OA Dated Jul. 28, 2008 for U.S. Appl. No. 10/934,306, 34 pages.
OA Dated Oct. 21, 2008 for U.S. Appl. No. 10/927,452, 22 pages.
OA Dated Oct. 3, 2008 for U.S. Appl. No. 11/165,070, 11 pages.

* cited by examiner

FREEFORM DIGITAL INK REVISIONS

CROSS REFERENCE TO RELATED APPLICATIONS

This application is a Continuation-in-Part of co-pending U.S. patent application Ser. No. 10/934,306, entitled, "FREEFORM DIGITAL INK ANNOTATION RECOGNITION", filed on Sep. 3, 2004, and is related to co-pending U.S. application Ser. No. 11/165,070, entitled, "LIFTING INK ANNOTATIONS FROM PAPER", filed on Jun. 23, 2005, co-pending U.S. patent application Ser. No. 10/758,370, entitled, "IMAGE-BASED DOCUMENT INDEXING AND RETRIEVAL", filed on Jan. 15, 2004, and co-pending U.S. patent application Ser. No. 11/095,393, entitled, "SYSTEMS AND METHODS FOR DETECTING TEXT", filed on Mar. 31, 2005.

BACKGROUND

Advancements in computing and communications technology have significantly altered business practices regarding document creation and use. A great many, if not most, documents are created, used, and stored in electronic formats. Such use typically includes annotation and editing functions. In current systems, annotations and edits can be performed using common input devices such as a keyboard and a mouse. Other devices, such a pen-based input devices can also be used.

Some existing systems allow a user to make freeform digital ink annotations on a document, and to store such annotations with the document in a variety of ways. For example, the annotations may be treated as a separate layer of graphics over the content of a document, or they may be treated as graphics that are integrated in a graphical representation of the content of the document.

Digital ink annotations or revision markings in electronic documents used by such systems are not truly integrated with the actual document contents with which the annotations or revisions are associated, however. Current systems limit the ability of a user to modify a document's content with digital ink annotations or revision markings, and none to our knowledge support the ability to take action based on a user's digital ink annotations.

SUMMARY

The following presents a simplified summary in order to provide a basic understanding. This summary is not an extensive overview. It is neither intended to identify key/critical elements nor to delineate scope. Its sole purpose is to present some concepts in a simplified form as a prelude to the more detailed description later presented. Additionally, section headings used herein are provided merely for convenience and should not be taken as limiting in any way.

An electronic annotation module accesses a freeform digital ink annotation from a document. The annotation is sent to a command module that determines whether the annotation is associated with a command. If so, the command module executes the command on the document. Layout and flow of the document are affected, and the effects of execution of the command are presented for examination.

A command module selectively executes commands associated with an annotation on a document. Layout of the document is affected by the execution of the command. The granularity at which commands upon the electronic copy of the document and layout and flow of the electronic copy of the document can be selectively controlled.

A command module selectively executes commands associated with an annotation on a document. Executed commands can be undone or redone in a non-linear fashion by selecting a command from among a group of available commands. Executed commands can be undone or redone individually without having to undo or redo other commands that were executed after or before the selected command. Layout and flow of the electronic copy of the document are affected based upon the undone or redone command and results of the undo or redo action are presented for examination.

The disclosed and described components and methods comprise the features hereinafter described and particularly pointed out in the claims. The following description and the annexed drawings set forth in detail certain illustrative aspects. These aspects are indicative, however, of but a few of the various ways in which the disclosed components and methods can be employed. Specific implementations of the disclosed and described components and methods can include some, many, or all of such components, methods and their equivalents. Variations of the specific implementations and examples presented herein will become apparent from the following detailed description when considered in conjunction with the drawings.

DETAILED DESCRIPTION

Figure 1:
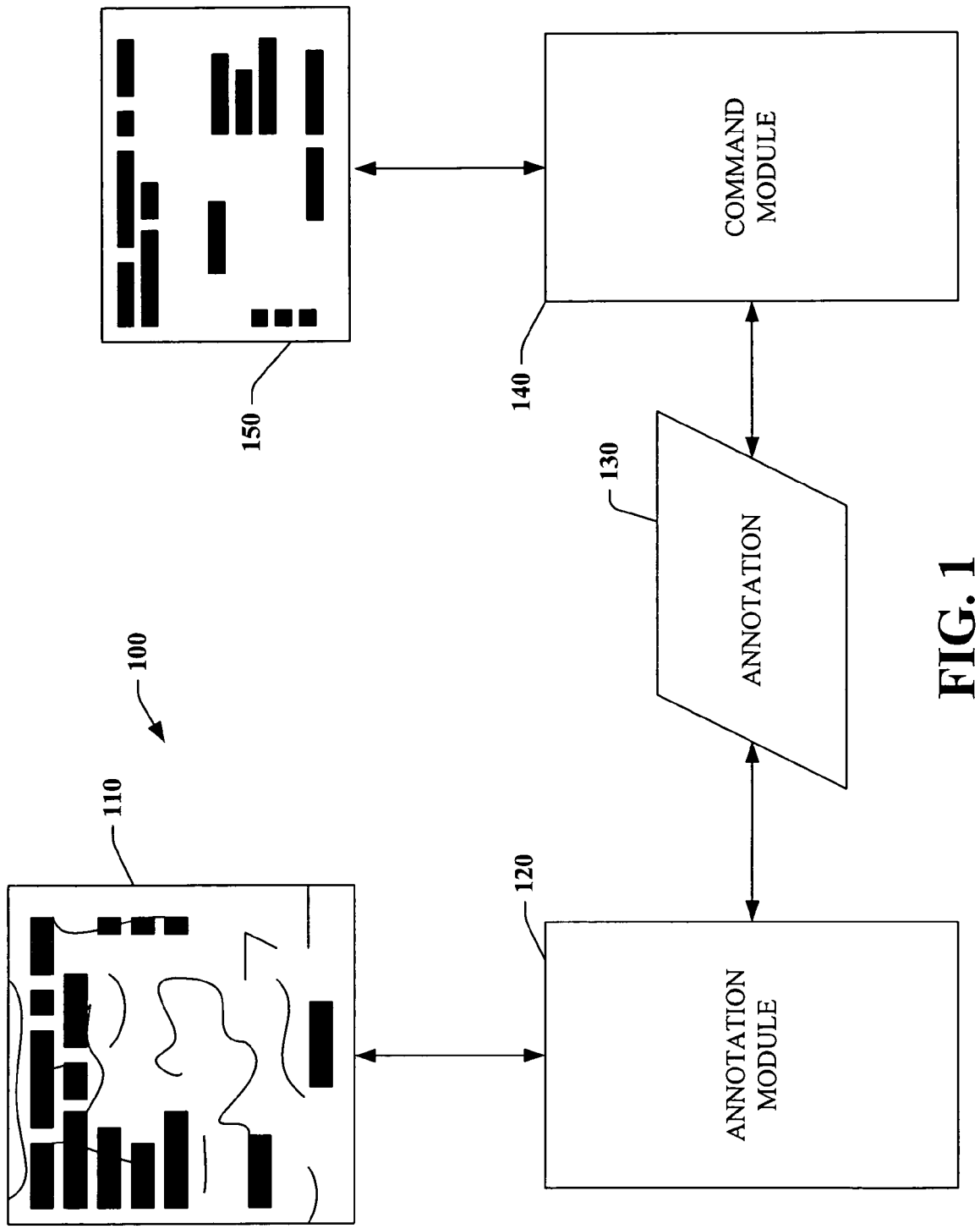
FIG. 1 is a system block diagram of an annotation command system

As used in this application, the terms "component," "system," "module," and the like are intended to refer to a computer-related entity, such as hardware, software (for instance, in execution), and/or firmware. For example, a component can be a process running on a processor, a processor, an object, an executable, a program, and/or a computer. Also, both an application running on a server and the server can be components. One or more components can reside within a process and a component can be localized on one computer and/or distributed between two or more computers.

Disclosed components and methods are described with reference to the drawings, wherein like reference numerals are used to refer to like elements throughout. In the following description, for purposes of explanation, numerous specific details are set forth in order to provide a thorough understanding of the disclosed subject matter. It may be evident, however, that certain of these specific details can be omitted or combined with others in a specific implementation. In other instances, certain structures and devices are shown in block diagram form in order to facilitate description. Additionally, although specific examples set forth may use terminology that is consistent with client/server architectures or may even be examples of client/server implementations, skilled artisans will appreciate that the roles of client and server may be reversed, that the disclosed and described components and methods are not limited to client/server architectures and may be readily adapted for use in other architectures, specifically including peer-to-peer (P2P) architectures, without departing from the spirit or scope of the disclosed and described components and methods. Further, it should be noted that although specific examples presented herein include or reference specific components, an implementation of the components and methods disclosed and described herein is not necessarily limited to those specific components and can be employed in other contexts as well. Artificial intelligence based systems (for example, explicitly and/or implicitly trained classifiers) can be employed in connection with performing inference and/or probabilistic determinations and/or statistical-based determinations as in accordance with one or more aspects of the subject invention as described hereinafter. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems for example, support vector machines, neural networks, expert systems, Bayesian belief networks, fuzzy logic, and data fusion engines, among others, can be employed in connection with performing automatic and/or inferred action in connection with the subject invention.

Furthermore, the present invention may be implemented as a method, apparatus, or article of manufacture using standard programming and/or engineering techniques to produce software, firmware, hardware, or any combination thereof to control a computer to implement the disclosed invention. The term "article of manufacture" as used herein is intended to encompass a computer program accessible from any computer-readable device, carrier, or media. For example, computer readable media can include but are not limited to magnetic storage devices, for example, hard disk, floppy disk, and magnetic strips, among others, optical disks such as compact disks (CDs) and digital versatile disks (DVDs), among others, smart cards, and flash memory devices like, card, stick, and key drives, among others. Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many minor modifications may be made to this configuration.

FIG. 1 is a system block diagram of an annotation command system 100 in accordance with an aspect of the disclosed invention. The annotation command system uses an image 110 of a document that includes handwritten annotations. Such annotations can be interlineations, revision marks, marks for emphasis such as underlining, circling, or highlighting, margin notes, or other annotations. Although some annotations can be little more than mere doodles, other annotations, for example, revision marks, indicate that some action concerning text of the document is to be taken. For instance, a strikeout mark placed through a word indicates that the word is to be deleted. A caret (^) placed in the typewritten text and accompanied by handwritten text indicates that the handwritten text is to be inserted at the position of the caret. A paragraph mark (¶) indicates that a new paragraph is to begin at the position the mark was placed. Many other symbols can be used to indicate an action to be taken.

In a computing environment, such marks that indicate actions to be taken can be treated as an implied command that the computer can execute. The annotation and command system 100 can recognize annotations generally using the annotation module 120. Within a set of recognized annotations, the annotation module can identify and separate out an individual annotation 130. A command module 140 accesses the annotation 130 to determine whether the annotation 130 is of a class of annotations that are treated as implied commands. Such implied command annotations can be predefined, such as well-known revision marks, or can be a newly created symbol that a user can associate with a command to execute when the newly created symbol is recognized as an annotation.

The command module 140 can execute a command or commands associated with the annotation 130 to revise an electronic copy of the document 150. Such revisions alter the content of the document and consequently its appearance. Contents of electronic documents flow in the sense that text or other content is rearranged when content is added, moved, or deleted within the document. Generally, there are multiple levels of granularity for flow. At a line level, contents of a line can be rearranged based upon changes to items in the line. A level above the line level is a paragraph level. Similarly, when contents of a paragraph are altered, layout of the paragraph may be altered. Flow concepts can also be applied at the levels of sections and entire documents. Contents can be pushed onto preceding or succeeding levels at each level of granularity or a sum of additions can negate effects of deletions (or vice-versa) resulting in no change in flow. Depending upon specific alterations made at each level of granularity, a change may or may not cause contents to reflow within or between granularity levels.

In another possible implementation, the image 110 of a document can instead be an electronic version of the document that includes electronic annotations. Such a document can be created in a wide variety of ways. Among those ways specifically contemplated is through use of a tablet computing device that allows a user to make pen- or stylus-based input on a document. The annotation module 120 can access the document 110 and identify an annotation 130 in the document 110. The command module 140 can act upon the annotation 130 and execute a command associated with the annotation 130. A modified version 150 of the document 110 can thereby be produced.

Figure 2:
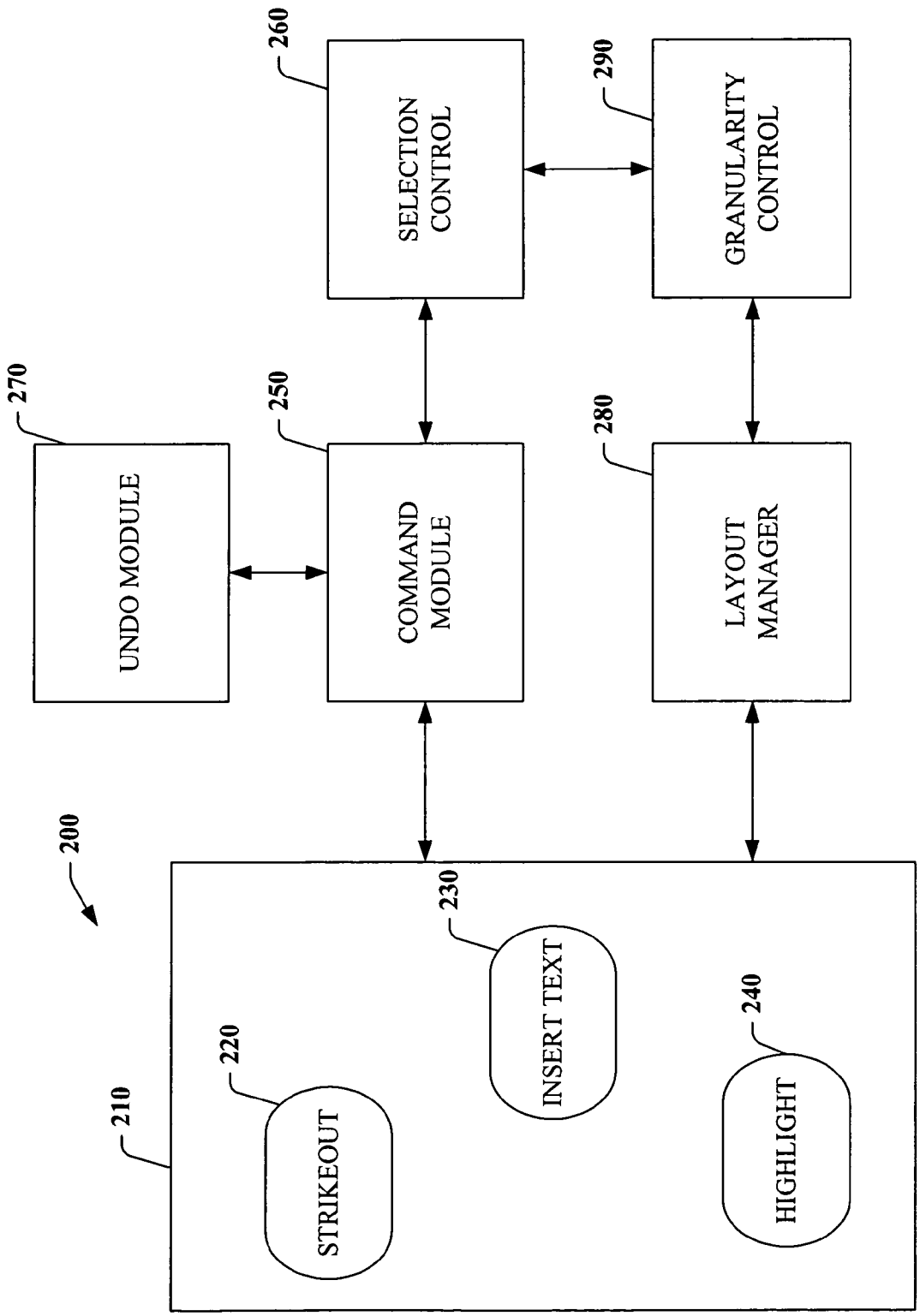
FIG. 2 is a system block diagram of an annotation command and layout system.

FIG. 2 is a system block diagram of an annotation command and layout system 200 in accordance with an aspect of the invention. The annotation command and layout system 200 includes an electronic document 210 that includes a number of annotations 220, 230, 240. Annotations 220, 230 are clearly implied commands to delete and insert text, respectively. Annotation 240 is a highlight annotation. Highlighting can be can be interpreted in multiple ways. The annotation can be interpreted first as not falling within the class of annotations that are implied commands. If interpreted as an implied command, multiple commands can be mapped to highlighting. For example, if interpreted as a command to emphasize text, such emphasis can be added by applying underlining, bold typeface, italic typeface, changing case to all capital letters, or another way. Highlighting can also be interpreted as indicating the highlighted text is important and should be indexed for quick retrieval later.

In the case of ambiguous annotations such as highlighting, at least two approaches are possible. First, a user can predefine a meaning for the annotation. Alternatively, the user can choose an appropriate command at a time when the ambiguous annotation is encountered, such as by choosing a command from a list of available commands.

A command module 250 interacts with the electronic document 210 and a selection control 260. The selection control can provide an ability to selectively execute commands associated with annotations. For example, a first instance of a strikeout annotation can be executed by the command module 250 but a second instance could be ignored. Similarly, the selection control can provide an ability to disable execution of a single command altogether, only when a specific command is followed by a second specified command, or at occurrence of some other user-specified scenario. For instance, a user can decide that highlighting a sentence indicates that it should be indexed for quick retrieval later; and that highlighting and underlining a sentence means that the sentence should be copied and inserted into a database.

The electronic document 210 can also be accessed by a layout manager 280. The layout manager 280 can reposition elements of the electronic document in response to occurrences of certain events, for instance, execution of commands associated with annotations. The layout manager 280 also interacts with a granularity control 290. The granularity control 290 provides an ability to exert control over layout behavior at various levels of granularity. For example, a user can fix a granularity level at the paragraph level such that content can reflow at lower levels of granularity but that structures of paragraphs will not be affected. Other granularity-based controls can be employed as well.

The command module 250 can also interact with the granularity control 290. For example, a user can adjust granularity for commands issued. For example, a user could indicate that the command module is not to execute commands unless execution of the command will have layout effects only at or below a certain granularity level, such as the line level. Alternatively, the user could indicate that a command should be executed at a specific granularity level, such as applying a typeface to an entire paragraph instead of a single word as indicated by an annotation. Other scenarios are possible as well.

The command module 250 also interacts with an undo module 270. Typically, undo commands are linearly or temporally arranged and chained together in the sense that in order to undo a command that was executed in the past, a user also must undo all commands that followed the desired command. The undo module 270 is non-linear. A user can select any previously-executed command and undo that single command without undoing commands that followed in time. Correspondingly, a user can immediately see an effect on layout of the electronic document 210 when a specific command is undone without losing effects of subsequent commands.

Figure 3:
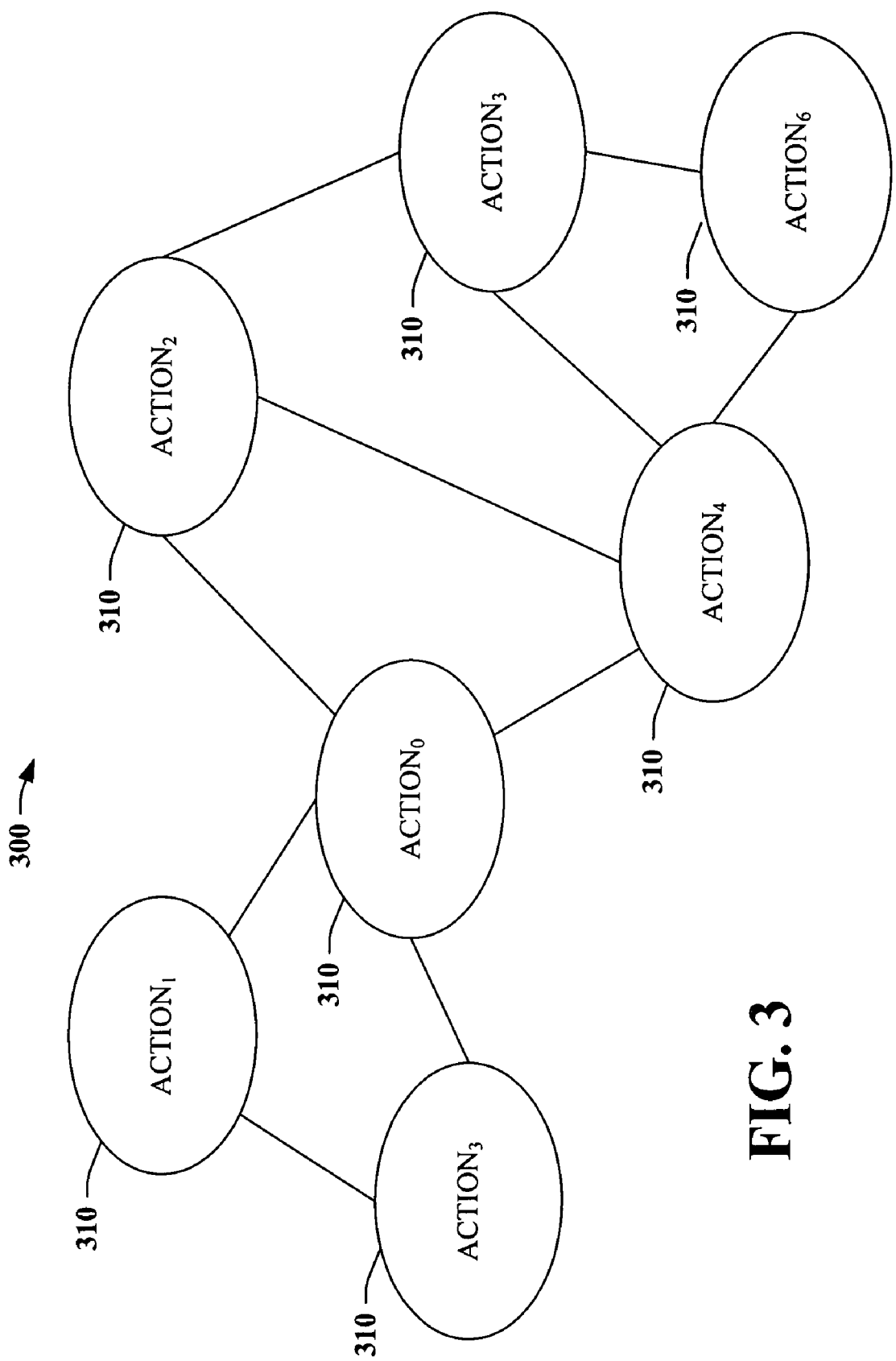
FIG. 3 is a block diagram of a map of undo commands

FIG. 3 is a block diagram of a map 300 of undo commands in accordance with another aspect of the invention. The undo module 270 (FIG. 2) can provide non-linear undo capabilities by storing actions to be undone in an undirected graph or map of actions, such as the map 300. The map 300 includes a group of actions 310. Each action is uniquely identified (depicted by a subscripted number) so that a user can identify a specific action to be undone.

When a user creates a new annotation, other annotations that depend from that new annotation for correct behavior can be linked to the new annotation. Linking can occur at a time when the new annotation is interpreted as a command, regardless of whether the command is executed and placed in the map 300.

For example, a user can make an annotation by crossing out a word in a sentence. The user can make a second annotation by crossing out the entire sentence. The annotation representing the word cross-out depends from the second annotation crossing out the entire sentence in the sense that if the second annotation is executed as a command, thereby striking the sentence from the document, the first annotation does not have any effect.

As another example, the user can make an annotation by highlighting a sentence. The user can make a second annotation by crossing out part of the same sentence. The annotation representing the highlighting depends from the annotation representing the cross-out in the sense that if the cross-out is executed and that part of the sentence is deleted from the document, then the highlight only highlights the remaining portion of the sentence. Generally, commands that can alter content of the document can be depended upon. Any command can depend on another command, including commands that can alter content of the document.

When an action 310 is undone, the action 310 is removed from the undo map and added to a similar redo map (not shown). The redo map shares the attribute of non-linearity for flexibility in choosing commands. Similarly, when an action is redone, the action is removed from the redo map and added back to the undo map.

The value of the above-described system is better appreciated by understanding the importance of recognizable annotations. While the vision of the paperless office remains a future goal, many technologies including high-resolution displays, advances in digital typography, and the rapid proliferation of networked information systems are contributing to a better electronic reading experience for users today. One important area of enabling research is digital document annotation. Digital annotations persist across document versions and can be easily searched, shared, and analyzed in ways that paper annotations cannot.

With reference to FIGS. 4-9, flowcharts in accordance to various aspects of the invention are presented. While, for purposes of simplicity of explanation, the one or more methodologies shown herein, for example, in the form of a flow chart, are shown and described as a series of acts, it is to be understood and appreciated that the subject invention is not limited by the order of acts, as some acts may, in accordance with the subject invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Figure 4:
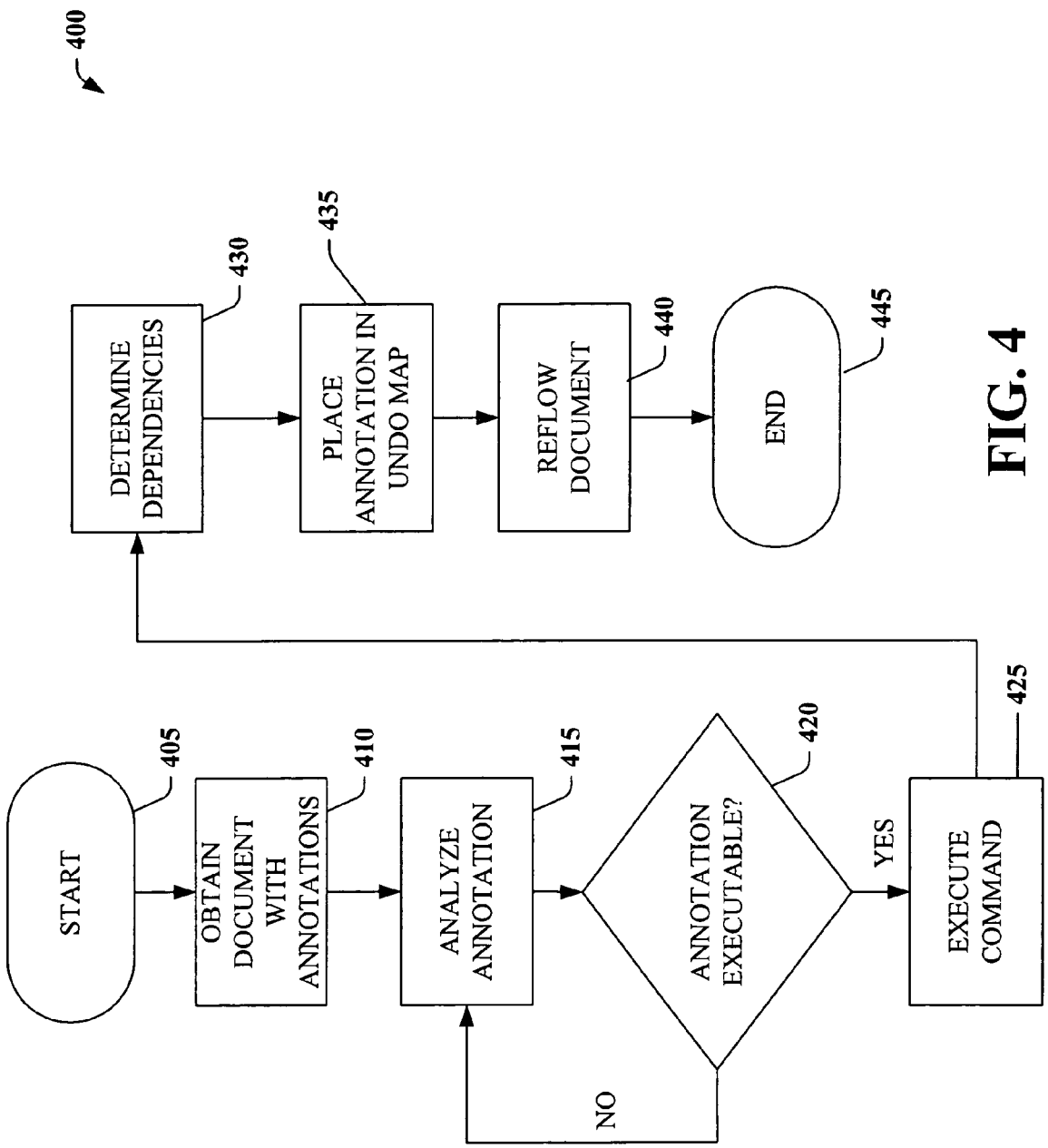
FIG. 4 is a system block diagram of an annotation lifting system.

FIG. 4 is a flow diagram depicting a general processing method 400 that can be used in conjunction with various components disclosed or described herein. Processing of the method 400 begins at START block 405 and continues to process block 410. At process block 410 a document that includes annotations is obtained. Such a document can be preexisting on a computing system or can be created specifically for use with the method 400.

At process block 415, each annotation in the document is analyzed to determine whether the annotation is executable in the sense that it represents a command to be performed on the document. Processing continues at decision block 420 where a determination is made whether the analyzed annotation is to be executed, such as in response to an instruction from a user. If yes, a command associated with the annotation is executed at process block 425. If the determination is no, processing returns to process block 415 where another annotation is analyzed. It is contemplated that some mechanism for avoiding infinite processing loops can be employed at an appropriate place in the method 400.

Processing of the method 400 continues at process block 430 where dependencies for the annotation are determined. At process block 435, the annotation is placed in an undo map. Processing continues at process block 440 where the document is reflowed. Processing terminates at END block 445.

Figure 5:
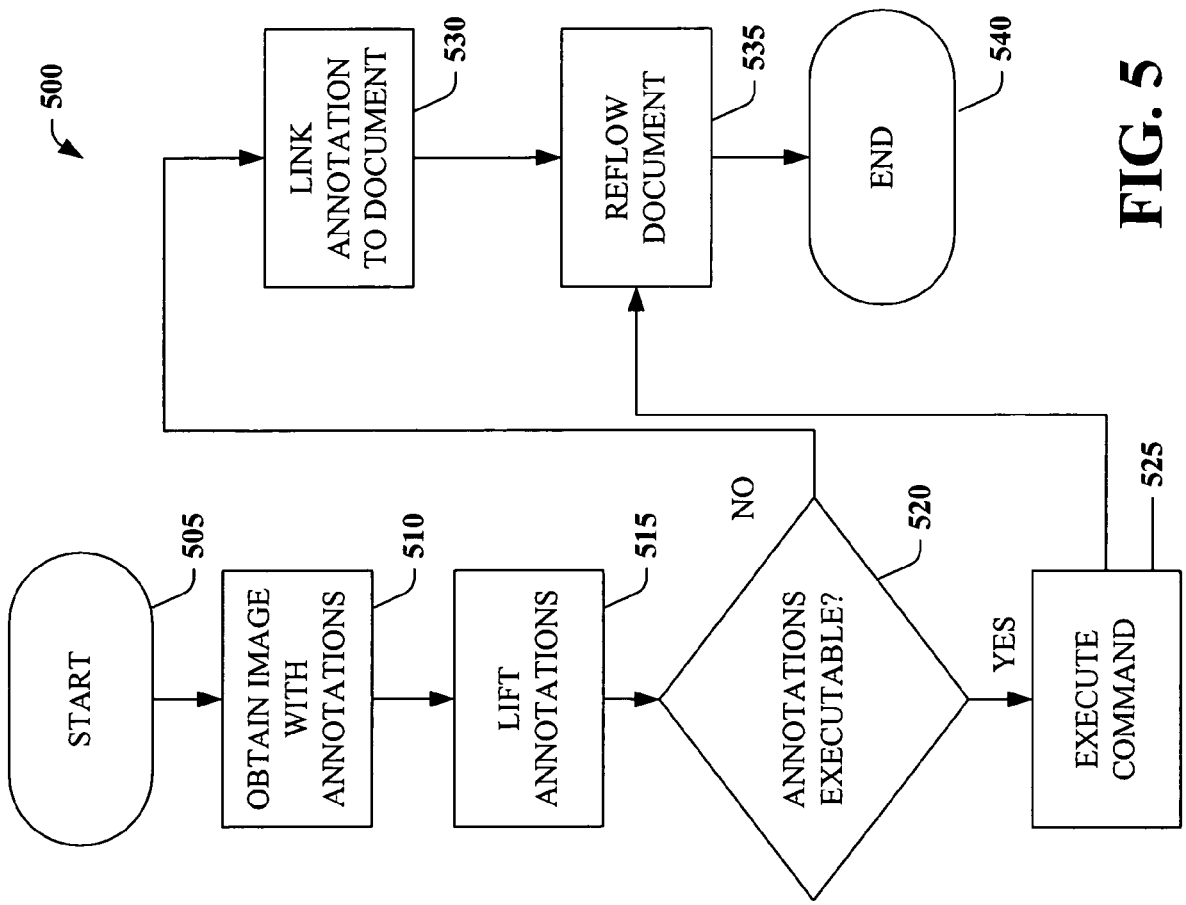
FIG. 5 is a flow diagram depicting a general processing flow.

FIG. 5 is a flow diagram depicting a general processing flow 500 that can be used in conjunction with various components disclosed or described herein. Processing begins at START block 505 and continues to process block 510. At process block 510 an image of a document including annotations is obtained. At process block 515, annotations are lifted from the image of the document. Processing continues at decision block 520 where a determination is made whether lifted annotations are executable. If yes, an associated command can be executed at process block 525. If no, processing continues at process block 530 where the annotation is linked to an electronic copy of the document. Processing from either process block 525 or 530 continues at process block 535 where the electronic copy of the document is reflowed. Processing terminates at END block 540.

Figure 6:
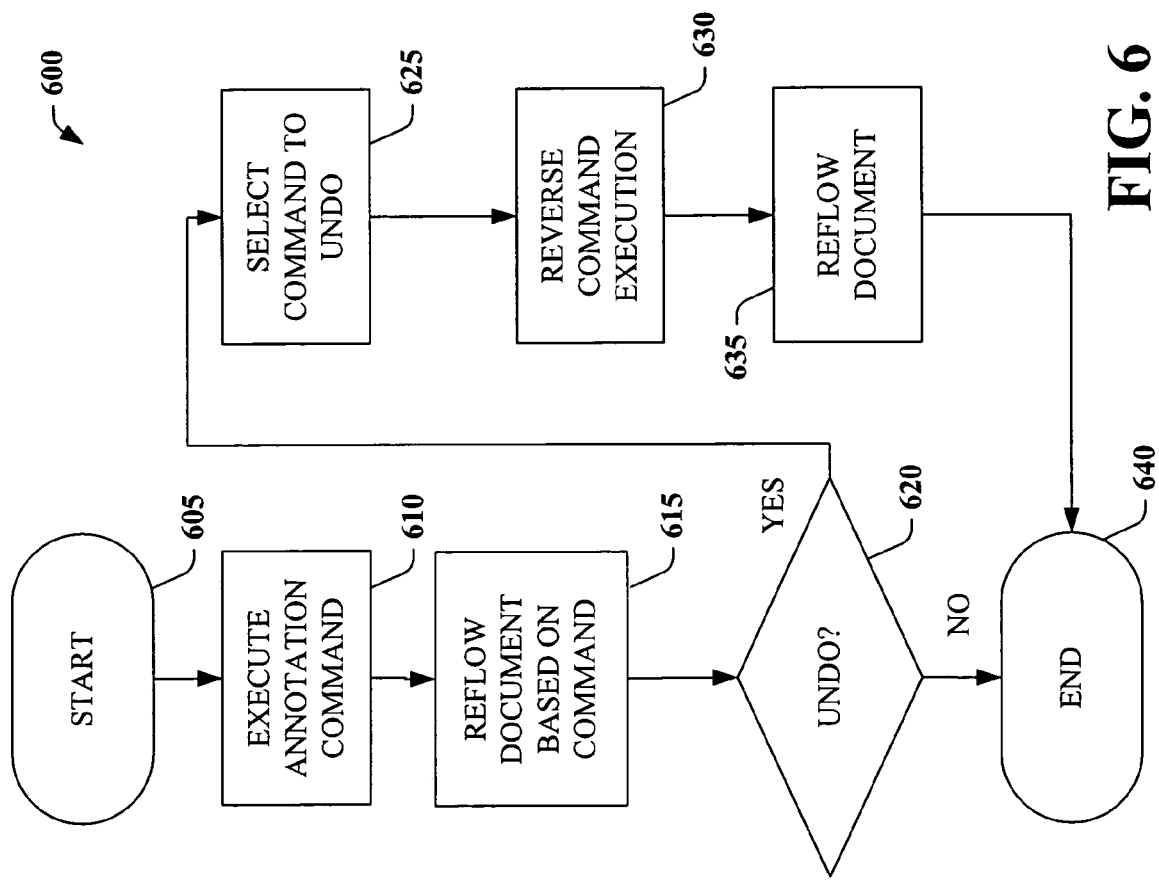
FIG. 6 is a flow diagram depicting a general processing flow.

FIG. 6 is a flow diagram depicting a general processing flow 600 that can be used in conjunction with various components disclosed or described herein. Processing begins at START block 605. At process block 610, an annotation command is executed. Processing continues to process block 615 where an electronic document is reflowed based upon the executed command. At decision block 620, a determination is made whether an undo command has been received. If yes, processing continues to process block 625 where a command to undo is selected. The selected command is reversed at process block 630. Processing continues to process block 635 where the electronic document is reflowed based upon the undone command. Processing terminates at END block 640. Similarly, if the determination made at decision block 620 is no, processing terminates at END block 640.

Figure 7:
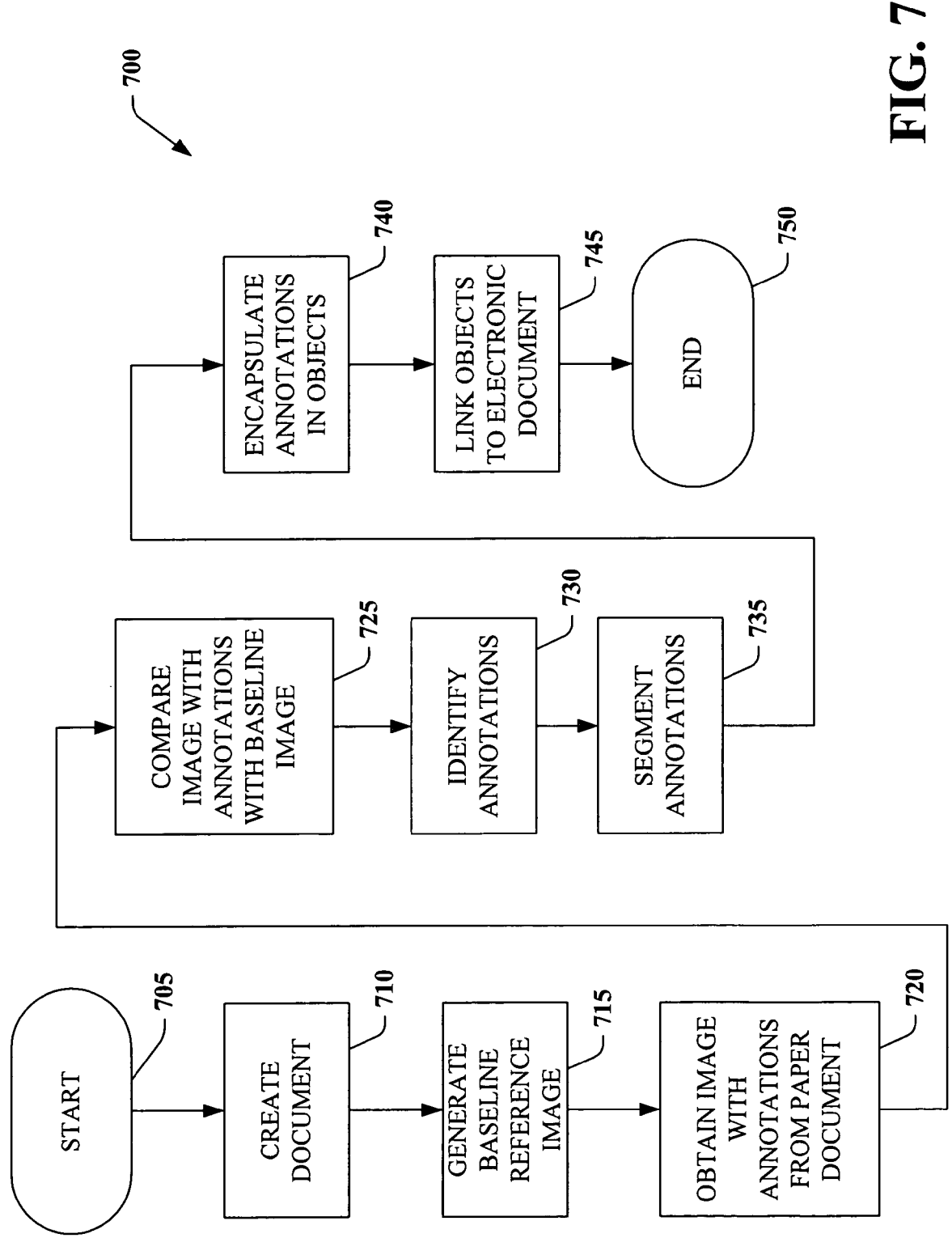
FIG. 7 is a flow diagram depicting a general processing flow.

FIG. 7 is a flow diagram depicting a general processing flow 700 that can be used in conjunction with various components disclosed or described herein. Processing begins at START block 705 and continues to process block 710. At process block 710 an electronic version of a document is created. Processing continues to process block 715 where a baseline reference image is generated. At process block 720 an image of a document that includes annotations is obtained. Processing continues to process block 725 where the baseline reference image is compared with the images of the document that includes annotations.

Annotations of the document are identified at process block 730. At process block 735, annotations are segmented. Processing continues at process block 740 where segmented annotations are encapsulated in objects. At process block 745, the objects are linked to an electronic version of the document. Processing concludes at END block 750.

Figure 8:
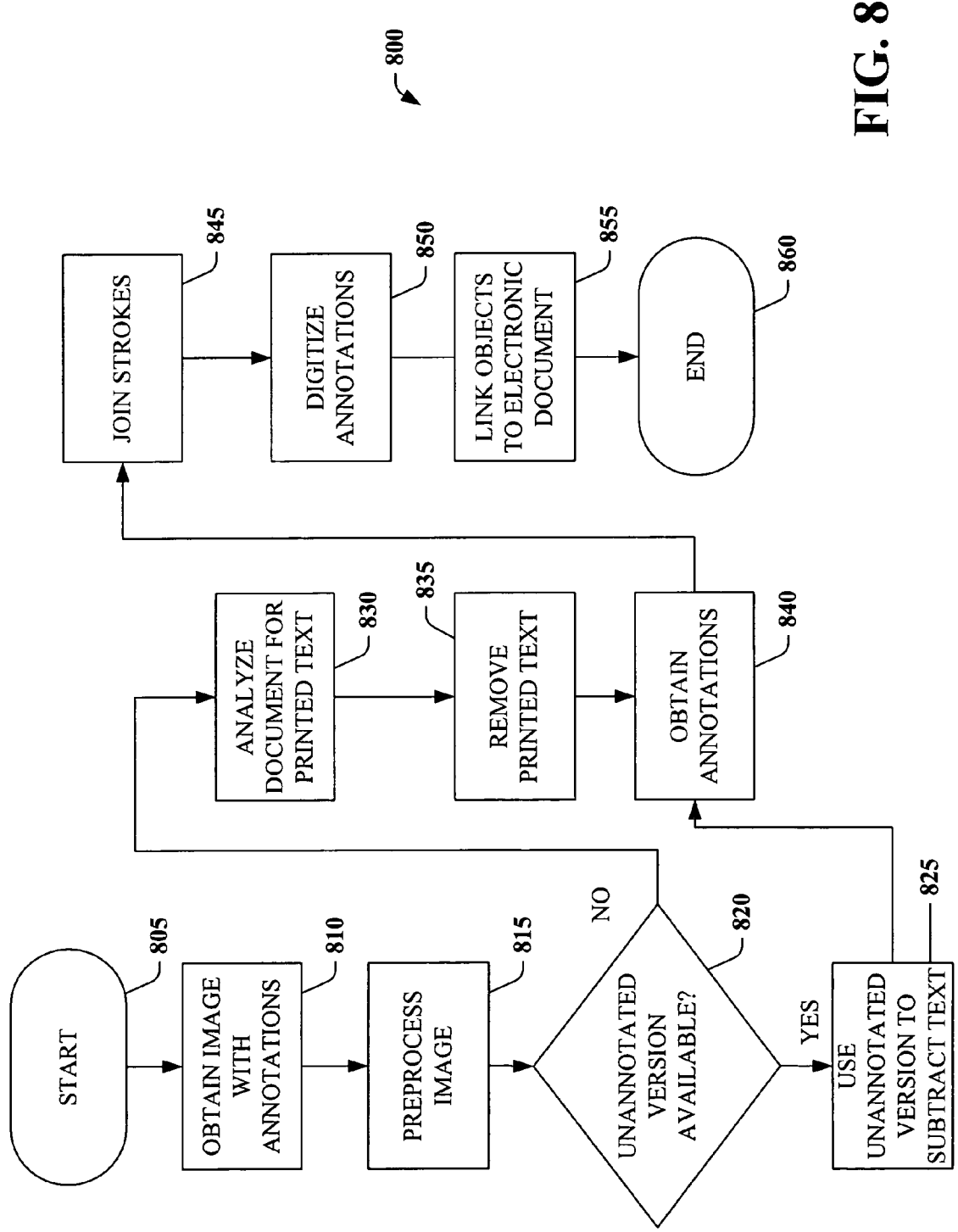
FIG. 8 is a flow diagram depicting a general processing flow.

FIG. 8 is a flow diagram depicting a general processing flow 800 that can be used in conjunction with various components disclosed or described herein. Processing begins at START block 805 and continues to process block 810. At process block 810 an electronic version image of a document that includes annotations is obtained. Processing continues to process block 815 where preprocessing of the image occurs. At decision block 820 a determination is made whether an unannotated version of the document exists. If no, processing continues at process block 825 where the document is analyzed for printed text. At process block 830 the printed text is removed.

If the determination made at process block 820 is yes, processing continues at process block 835 where the unannotated image of the document is used to subtract text from the annotated image. Processing continues from either process block 830 or process block 835 at process block 840 where annotations are obtained. At process block 845 strokes of annotations are joined. Processing continues at process block 850 where the annotations are digitized. The digitized annotations are linked to the electronic document at process block 855. Processing concludes at END block 860.

Figure 9:
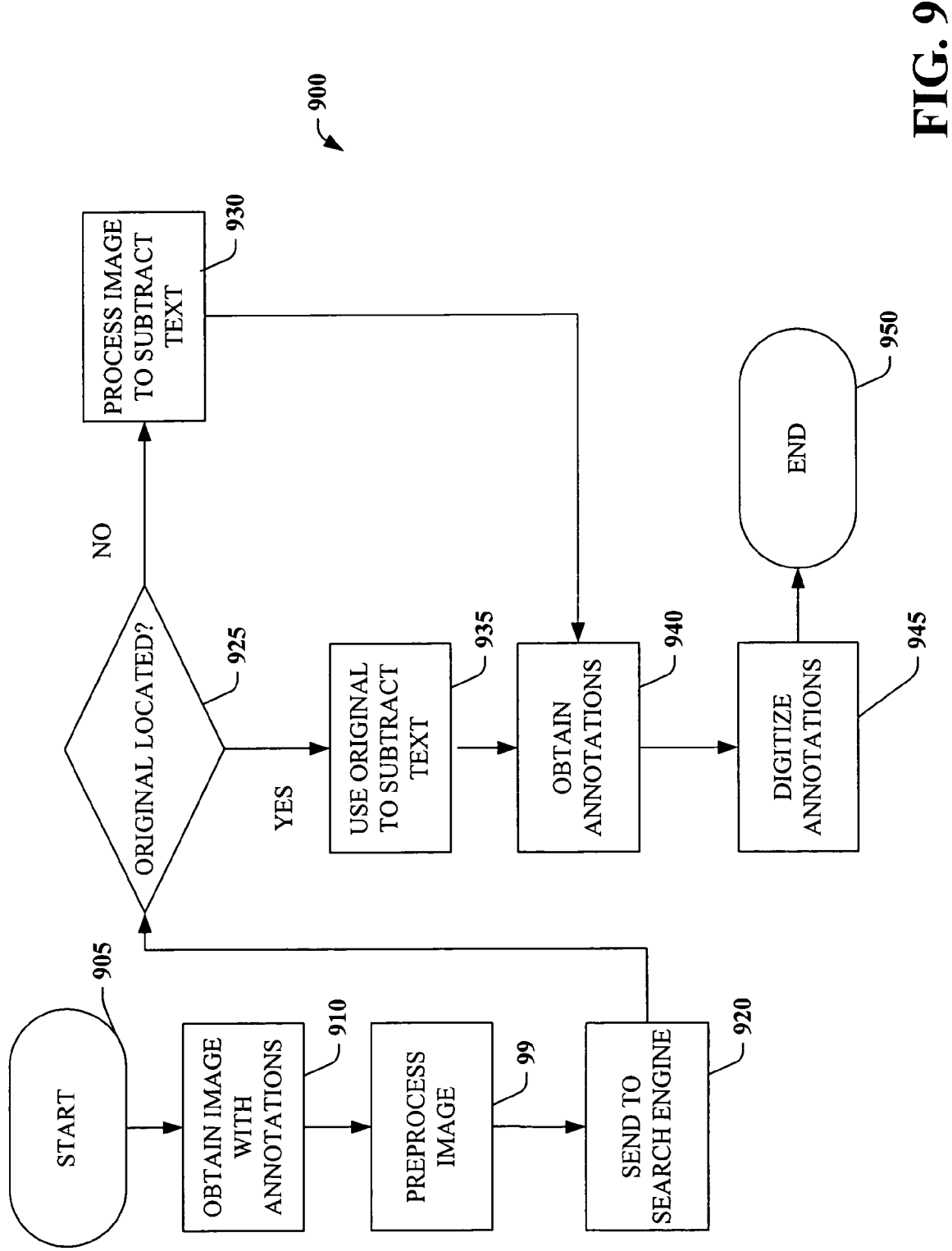
FIG. 9 is a flow diagram depicting a general processing flow.

FIG. 9 is a flow diagram depicting a general processing flow 900 that can be used in conjunction with various components disclosed or described herein. Processing begins at START block 905 and continues to process block 910. At process block 910 an electronic version image of a document that includes annotations is obtained. Processing continues to process block 915 where preprocessing of the image occurs. At process block 920 the preprocessed image is sent to a search engine. At decision block 925 a determination is made whether an original unannotated version of the document can be located. If no, processing continues at process block 930 where the document is processed to remove printed text. If yes, processing continues at process block 935 where the located original is used to subtract printed text from the annotated image. Processing continues from either process block 930 or 935 at process block 940 where annotations are obtained. At process block 945 the annotations are digitized. Processing concludes at END block 950.

The components and methods disclosed and described herein, for example in connection with identification tasks, handwriting analysis tasks, and searching tasks, among others, can employ various artificial intelligence-based schemes for carrying out various tasks. For example, analysis of annotations or mapping of annotations to commands can be facilitated by using an automatic classifier system and process. Moreover, when more than one annotation is present or when such annotations potentially interfere with each other, an automatic classifier system can be used to manage the annotations and prevent such interference.

A classifier is a function that maps an input attribute vector, $X=(x_1, x_2, x_3, x_4, \ldots x_n)$, to a confidence that the input belongs to a class, that is, $f(X)=\text{confidence}(\text{class})$. Such classification can employ a probabilistic and/or statistical-based analysis (for example, factoring into the analysis utilities and costs) to prognose or infer an action that a user desires to be automatically performed. In the case of software component replacement systems, for example, attributes can be file descriptors such as filenames, signatures, hash functions, upgrade codes, compatibility codes, version numbers, build numbers, release dates, or other data-specific attributes derived from the device driver files and the classes are categories or areas of interest, for example, descriptors of other device drivers that the device driver can update.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to, training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (for example, by a generic training data) as well as implicitly trained (for example, by observing user behavior, receiving extrinsic information). For example, SVM's are configured by a learning or training phase within a classifier constructor and feature selection module. Thus, the classifier(s) can be used to automatically perform a number of functions, including but not limited to determining whether a device should be sent data.

Figure 10:
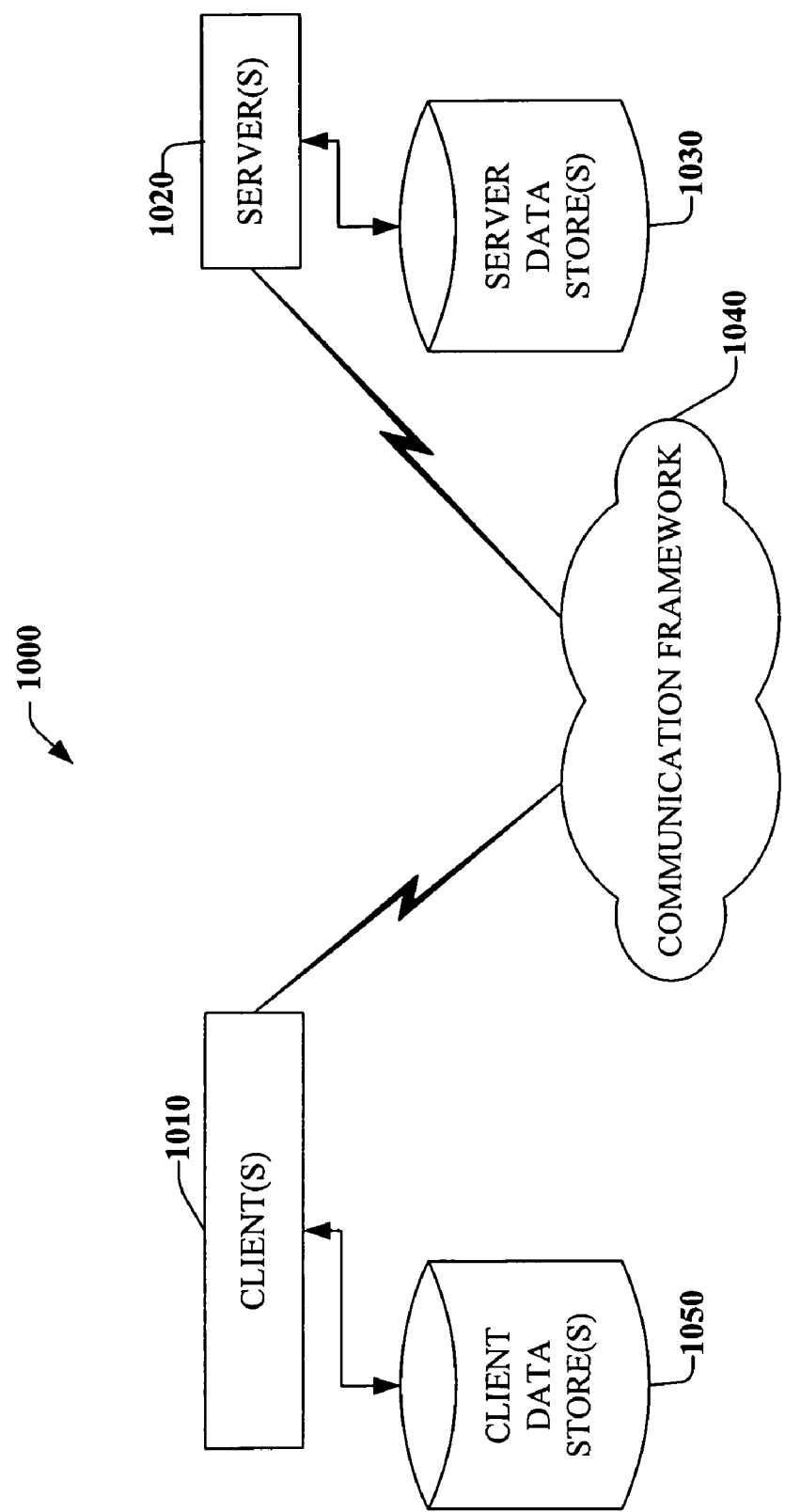
FIG. 10 is a schematic block diagram of a sample-computing environment.
Figure 11:
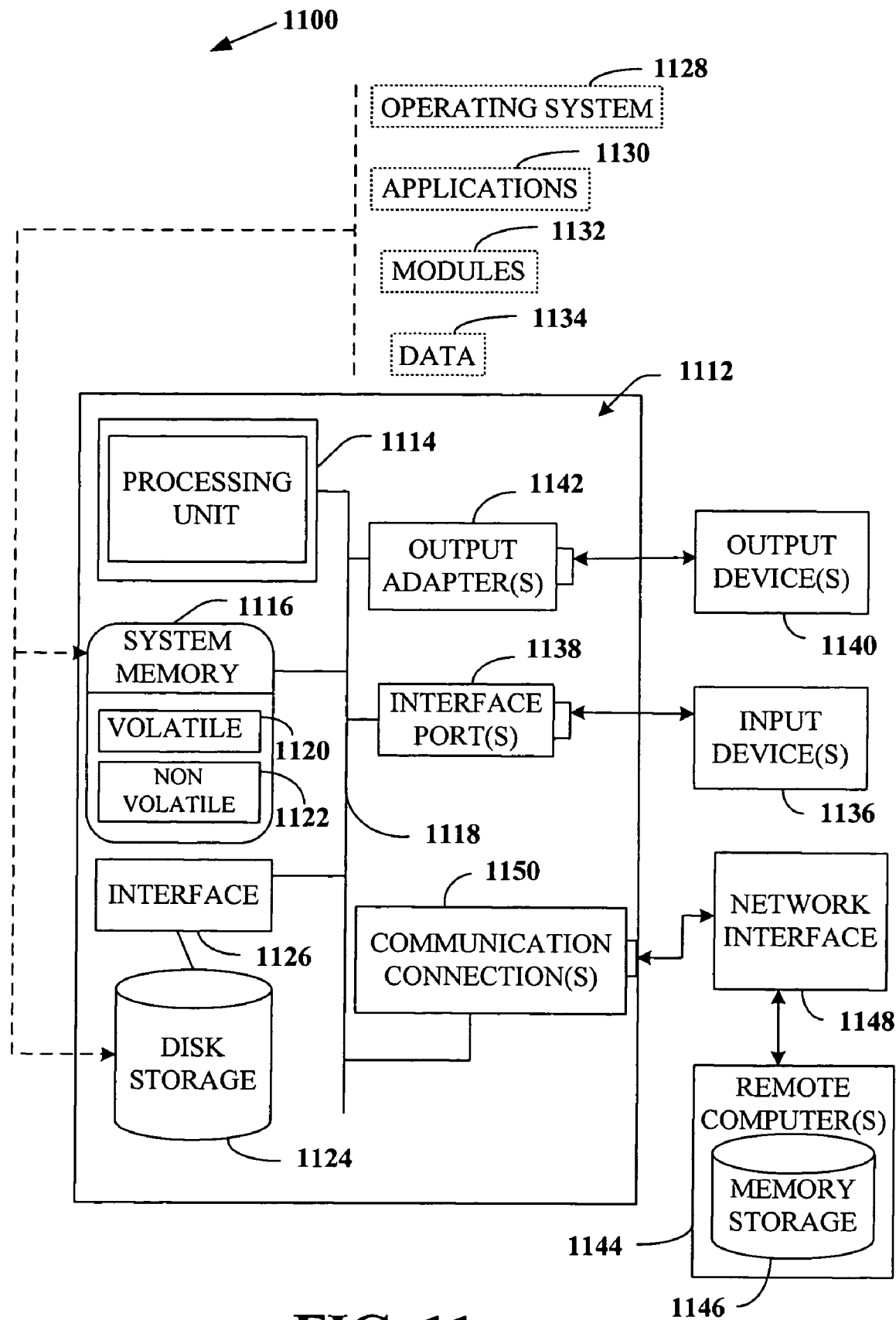
FIG. 11 is an exemplary environment for implementation.

In order to provide additional context for implementing various aspects of the subject invention, FIGS. 10-11 and the following discussion is intended to provide a brief, general description of a suitable computing environment within which various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 10 is a schematic block diagram of a sample-computing environment 1000 with which the subject invention can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads or processes to perform transformations by employing the subject invention, for example.

One possible means of communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1040.

With reference to FIG. 11, an exemplary environment 1100 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multi-processor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. For example, FIG. 11 illustrates a disk storage 1124. The disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. The operating system 1128, which can be stored on the disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject invention can be implemented with various operating systems or combinations of operating systems.

A user enters commands or information into the computer 1112 through input device(s) 1136. The input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A system embodied on a computer-readable storage medium that facilitates digital ink revisions, comprising:
   an annotation module that recognizes a handwritten annotation in an image of a document; and
   a command module that executes a command associated with the recognized handwritten annotation, the association between the command and the recognized handwritten annotation is user-defined, the command module allowing a user to specify a granularity level such that only commands that will affect the document layout at or below the specified granularity level will be executed, wherein specification of a line level prevents execution of commands that would affect the layout above the line level, specification of a paragraph level prevents execution of commands that would affect the layout above the paragraph level, and specification of a section level prevents execution of commands that would affect the layout above the section level.

2. The system of claim 1, the annotation module differentiates between an executable handwritten annotation and a non-executable handwritten annotation.

3. The system of claim 2, the command module selectively enables execution of the executable handwritten annotation.

4. The system of claim 3, further comprising a layout manager that adjusts a layout of the document based at least in part upon the executed command.

5. The system of claim 4, the layout manager selectively adjusts the layout of at least a section of the document, the manner in which the layout is adjusted is based at least in part on user-defined preferences.

6. The system of claim 5, the section of the document is at least one of a line, a paragraph, a page, a frame, a user-defined section, or an entire document.

7. The system of claim 6, further comprising an undo module that enables undoing a performed command and adding the undone command to a redo map, the redo map facilitates redoing the undone command by selecting the command from the redo map.

8. The system of claim 7, the undo module enables undoing a performed commands and redoing undone commands in a non-linear fashion.

9. A method for digital ink revisions, comprising:
  obtaining an image of a document containing at least one handwritten annotation;
  sending the image to a search engine to facilitate locating an original unannotated version of the document;
  recognizing a handwritten annotation in the image of a the document using the original unannotated version of the document;
  executing a command associated with the recognized handwritten annotation, the association between the command and the recognized handwritten annotation is based at least in part upon user-preferences;
  undoing the executed command associated with the handwritten annotation;
  adding the undone command to a redo map; and
  selecting the undone command from the redo map to facilitate redoing the command.

10. The computer-implemented method of claim 9, further comprising determining whether the handwritten annotation is executable.

11. The computer-implemented method of claim 10, further comprising selectively enabling execution of the command associated with the handwritten annotation that is determined to be executable.

12. The computer-implemented method of claim 11, further comprising adjusting a layout of the document based at least in part upon executing the command associated with the handwritten annotation.

13. The computer-implemented method of claim 12, further comprising restricting execution of the command based at least in part on the effect execution will have on the layout of the document, the conditions of restriction are defined by user preferences.

14. The computer-implemented method of claim 13, undoing the executed command associated with the handwritten annotation includes selecting the executed command from a non-linear group of commands.

15. A computer-implemented method for implementing digital ink revisions, comprising:
  obtaining an image of a document containing at least one handwritten annotation;
  sending the image to a search engine to facilitate locating an original unannotated version of the document;
  recognizing a handwritten annotation in the image of a document using the original unannotated version of the document;
  executing a command associated with the handwritten annotation, the association between the command and the recognized handwritten annotation is based at least in part on user actions; and
  adjusting a layout of the document based at least in part upon execution of the command associated with the handwritten annotation, the manner in which the layout is adjusted in response to the command is based at least in part on user-defined preferences applied to the document that allow a user to select a granularity level such that the layout of the document will only be modified at or below the selected level, wherein selection of a line level allows the layout to be modified only at or below the line level, selection of a paragraph level allows the layout to be modified only at or below the paragraph level, selection of a section level allows the layout to be modified only at or below the section level, and selection of the document level allows the layout of the entire document to be modified.

16. The method of claim 15, further comprising determining whether the handwritten annotation is executable.

17. The method of claim 16, further comprising automatically preventing execution of the command associated with the handwritten annotation based at least on the effect execution of the command will have on the layout of the document, the conditions for automatically disabling execution are user-defined.

18. The method of claim 15, further comprising adjusting a layout of the document based at least in part upon executing the command associated with the handwritten annotation and the user-specified level of granularity.

19. The method of claim 18, further comprising undoing the executed command associated with the handwritten annotation and adding the undone command to a redo map, the redo map facilitates redoing the undone command by selecting the command from the redo map.

20. The method of claim 19, undoing the executed command associated with the handwritten annotation includes selecting the executed command from a non-linear group of previously executed commands.

* * * * *